United States Patent Office 3,552,992
Patented Jan. 5, 1971

3,552,992
FROSTED COATINGS FOR GLASS
James M. Self and Paul C. Yates, Wilmington, Del., assignors to E. I. du Pont de Nemours and Company, Wilmington, Del., a corporation of Delaware
No Drawing. Filed Nov. 29, 1967, Ser. No. 686,711
Int. Cl. C03c 17/22
U.S. Cl. 117—54                                6 Claims

ABSTRACT OF THE DISCLOSURE

The present invention relates to a method and composition for coating glass surfaces to produce a light diffusing coating primarily for application in frosted light bulbs. A glass surface is sprayed or otherwise coated with a colloidal silica aquasol having an ultimate particle size of less than 30 millimicrons. The glass surface is held at a temperature above 90° C. during the coating process.

BACKGROUND OF THE INVENTION

This invention relates to the production of light diffusing coatings for glass and to the use of colloidal silica aquasols for rendering the surface of incandescent electric lamps light diffusing and capable of hiding an incandescent filament without substantially decreasing its luminosity.

At present, the most widely used method for preparing a frosted or light diffusing bulb is by etching the inside of the bulb with hydrogen fluoride. There are several disadvantages inherent in this method. Hydrogen fluoride is a toxic, corrosive and highly dangerous chemical presenting many safety problems in its use. During the etching process dangerous volatile fluorides are evolved; and toxic waste streams from the process must be discarded presenting a serious pollution control problem.

In the preparation of light bulbs, etching of the glass envelope is necessary in order to diffuse and disperse the light from the filament so that a softer, more pleasant light is radiated from the bulb. Without etching, the filament and the glare therefrom is readily apparent and gives a displeasing effect. Because of the difficulties associated with handling hydrogen fluoride methods have long been sought whereby "frosted" light bulbs could be made without the necessity of etching, i.e., by coating the bulb. Coating an electric lamp with a light diffusing layer is more desirable than etching with hydrogen fluoride, although there are limitations. Coatings must be able to survive handling and possible exposure to soiling and abrasion, especially exterior coatings. Interior coatings on the other hand, must not react during use or in any way impair the function of the filament. Any instability of the coating adversely affects the usable life of the lamp.

Many techniques have been utilized for the application of coatings to bulb surfaces, most of which are limited to the interior surface, and have in any case had only limited commercial applicability. For example, soluble, inorganic, nonvolatile materials such as soluble metallic silicates are used as binders for nonvolatile aggregates suspended in a liquid. These mixes are then sprayed into the bulb at a level sufficient to coat the bulb. The same type systems have been applied by an air jet, brushed or flushed with or without a binder to the interior of an etched or unetched bulb. Preetching increases the bonding strength of the coating to the glass.

Other systems have been devised in which an aggregate plus a binder, that decomposes on heating, is applied to the interior of the bulb followed by firing. Generally, coatings applied without a binder do not have sufficient adhesion. Sodium silicate or similar materials are difficult to dehydrate and the coating weakens the bulb. Another general method is the oxidation or hydrolysis of an appropriate silica compound in the gas or liquid phase inside the bulb. Coatings applied by this technique usually appear thin, have poor adhesion (flake off), lack uniformity and are expensive. According to the present invention, it has been discovered that certain stabilized colloidal silica aquasols are effective coating materials for glass envelopes. The resulting coatings are sufficiently hard and adherent that they can be successfully applied to the exterior of bulbs as well as the interior. They resist abrasion and can withstand the abuse of shipping and handling. As these coatings can be applied to the outside as well as the inside of the bulb, application of the coating is less costly and more easily automated. The glass is easily rendered sufficiently incandescent without undesirable opacity, and suitable for use in light bulbs. Silicas have heretofore been tried for this purpose. However, because of poor adherence properties and because of the fact that they ordinarily greatly contribute to the opacity of the bulb surface, they have not been satisfactory. Very thin layers of colloidal silica (on the order of several particles thick) when applied to a glass at ambient temperature followed by heating to a temperature sufficient to remove the water yield films that are quite transparent with very limited light diffusing properties. Very thick coatings applied to a glass surface at temperatures of around 20° C. followed by heating give highly cracked and crazed films which do not adhere well to the glass and will not give the smooth light diffusing surfaces necessary for light bulbs.

SUMMARY OF THE INVENTION

In accordance with the present invention, uniform light diffusing coatings can be formed on glass surfaces by application of a stabilized colloidal silica aquasol. As will be further described hereinafter, the terms colloidal silica or colloidal silica aquasol as used throughout this specification and the claims, is meant to denote a sol or the coating derived therefrom selected from the group consisting of alkaline stabilized colloidal silica, metal oxide coated acid stabilized colloidal silica, mixed alkaline stabilized colloidal alumino-silica; and alkaline stabilized lithium containing colloidal silica. The coatings are applied by spraying or other appropriate means to glass surfaces maintained at temperatures of near or above 100° C., from colloidal dispersions containing from 5–50% solids. The conditions of application are somewhat critical if light diffusing coatings are to be obtained. The resultant coatings are adherent, light-diffusing but not opaque, thin layers of silica particles of 3–30 millimicrons in ultimate particle diameter. Very thin coatings such as result from this invention greatly decrease the ability of the surface to reflect light and give a dazzle-free glass surface with minimal loss in transparency.

DESCRIPTION OF THE PREFERRED EMBODIMENTS

The substrate

The substrate can be any ordinary glass suitable for use in light transmission. Preferred are glasses suitable as envelopes for light bulbs, such as crown soda glasses and boro silicate, and metal oxide glasses.

The coating material

The light diffusing coatings are applied from alkaline or acid stabilized colloidal silica aquasols selected from the group consisting of alkaline stabilized colloidal silica, metal oxide coated acid stabilized colloidal silica, mixed alkaline stabilized colloidal alumina-silicate, and alkaline stabilized colloidal silica containing lithium.

The particle size will range from 3-30 millimicrons, but in any case the particle size of the ultimate silica particles will not exceed 30 millimicrons in average diameter.

The alkaline stabilized silica sols, which are one of the preferred coating materials of this invention, will have an average ultimate particle size of from 3-30 millimicrons, a pH from 8-12 and 5-40% $SiO_2$ solids. The preparation of sols of this type are well known to the art. The preparation of sols of this tye is described in U.S. Pat. No. 2,574,902 to Bechtold and Snyder, rule U.S. Pat. No 2,557,785, and Alexander U.S. Pat. No. 2,750,345. Preferred is "Ludox," a silica sol commercially available from E. I. du Pont de Nemours & Company. A sol having an average particle size of 12-15 millimicrons, solids content of 30-50% and a pH of 9-10.

The acidic metal oxide coated colloidal silica sols will also be of particle size of less than 30 millimicrons. They are prepared by treating the colloidal sols described above with a basic metal salt. Basic aluminum chloride is often employed. The pH range of the final products in the case of the metal coated sols will be from 1-6. These sols will generally contain 2-30% solids. The preparation and nature of sols of this type is described in Alexander and Bolt, U.S. Pat. No. 3,007,878; Mindrich and Reven, U.S. Pat. No. 3,139,406; and Mindrich and Thompson, U.S. Pat. No. 3,252,917.

Mixed alkali stabilized colloidal alumino-silica sols may also be employed. These alumino-silicate aquasols consist of alumino-silicate having the empirical formula $M^+[Al_2XAl_2O_3YSiO_2]^-$ where X ranges from 0-25, Y ranges from 1 to 200 and M is a monovalent cation selected from the group consisting of elements of group 1A of the periodic table, ammonium, and substituted ammonium ions. These sols will range in pH from 3-30 millimicrons, The preparation and description is found in Alexander, U.S. Pat. No. 2,974,108.

The lithium containing silica sols envisioned for use as coating materials according to this invention are silica sols having a high $SiO_2:Li_2O$ mole ratio of from 4:1 to 25:1, an average particle diameter of 3-30 millimicrons, and a pH from 9 to 14. They will generally contain from 1-25% solids. The description and preparation of these materials is found in Iler, U.S. Pat. No. 2,668,149.

The coating process

The glass substrate is cleaned and prepared for coating by heating to the desired temperature. The temperature of the substrate will be above 90° C. for effective coating and diffusion properties. 250 to 400° centigrade is preferred. The coating can be applied either by spraying, brushing, or flushing. The preferred method is air spraying with a Paasche type UT air brush.

The sols are generally applied as aquasols, water being the most preferred solvent but other solvents such as alcohols, for example ethanol and methanol, and alkyl amines could be used to dilute the aquasols to the desired concentration.

The percent silica solids in the sol as applied will vary from about 2-50%. The preferred operating range would be from about 10-30% silica solids, with 15-20% silica solids being the optimum range. The pH of these solutions will be ordinarily as described above with the value not being critical. Any pH which gives sufficient stability and pot-life to permit the performance of the spraying operation will be satisfactory. Alkali stable silica sols are most stable from a pH of 8-12 and acid stabilized sols are most stable from a pH of 1-6. The proper pH conditions for application of these sols will be easily determined by one skilled in the art.

The thickness of the final coating will be determined by one skilled in the art deending on the degree of dazzle-free or frosted properties desired for the resulting bulb. In general a thickness as measured in weight of coating per unit area of glass the substrate will be from 0.4 gram per 13 square inches of glass surface to 0.01 gram per 13 square inches. The preferred range will be from 0.1 to 0.07 gram per 13 square inches.

The coatings of this invention can be applied with equally beneficial results to surfaces which have been previously etched as well as unetched surfaces.

It is especially critical that the glass surface be heated and held at temperatures above 90° C. at the time of application of this coating. If a coating such as that described is applied to a conventional surface at ambient temperature followed by heating to remove the moisture the resulting surface would be either transparent or highly cracked and crazed depending on the thickness of the coating applied and the particle size. In any case, these films do not produce the desired light diffusing coatings and do not adhere well to the substrate surface.

The solutions when sprayed properly on the substrate give an adherent, porous and transluscent silica coating. A very thin coating still decreases significantly the ability of the surface to reflect light and renders the glass dazzle free. In general, the smaller the particle size, the more adherent; the harder and the less opaque is the resulting coating. However, as will be apparent, a given density of silica is necessary to provide the proper diffusion of light so that a balance will always be necessary depending on the particular application.

The final properties of the coating will be a function of several factors, which may readily be adjustable to produce the desired result in terms of diffusion and luminosity. The adjustments necessary will be well within the knowledge of one skilled in the art. Some of the factors affecting the nature and properties of the coating are:

(1) temperature of the substrate,
(2) particle size of the sol,
(3) rate of spraying,
(4) nature of the spray,
(5) concentration of the sol,
(6) angle of the spray to substrate,
(7) type of glass being treated, and
(8) nature of glass surface (how clean).

EXAMPLE I

A clear glass plate is heated to 300° C. While the plate is maintained at this temperature it is sprayed by a conventional spray gun with an alkali stabilized silica sol ("Ludox" HS-30) diluted with water to 15% $SiO_2$ solids. The plate is then cooled and has the appearance of a hydrogen fluoride etched glass surface. The weight increase of the clear glass plate is 0.1 gram. Comparison of the transparency of this plate to a commercial acid etched light bulb shows that the transmittance of light is the same or better with approximately the same amount of diffusion. The coating has a whiter appearance than a conventional acid etched bulb.

EXAMPLE II

A clear glass plate is heated to 400° C. While the plate is at this temperature it is sprayed by a conventional spray gun with a 20% solids solution of high ratio (8.5) lithium silicate (trade name Lithium Polysilicate 85). The plate is cooled. The coated surface has the appearance of a hydrogen fluoride etched glass surface. Comparison of the transparency of this plate to a commercial acid etched light bulb shows that it has equivalent transmittance and diffusion of light. The coating has good adhesion.

EXAMPLE III

A clear glass plate is heated to 300° C. While the plate is at this temperature it is sprayed by a conventional spray gun with a 20% solids solution of a positively charged acid stabilized silica sol solution prepared from "Ludox" HS-30. The cooled, coated plate has the appearance of a hydrogen fluoride etched glass surface. Comparison of this surface to a commercial acid etched light bulb, shows the two surfaces to have equal transparency and diffusion.

EXAMPLE IV

A clear glass plate is heated to 300° C. While the plate is at this temperature it is sprayed with a solution of 10% total solids aluminosilicate aquasol. The plate is then cooled and has the appearance of a hydrogen fluoride etched glass surface. Comparison of the transparency of this plate to a commercial acid etched light bulb shows the transmittance of light is the same or better with approximately the same amount of diffusion. The coating has a very white appearance.

What is claimed is:
1. A glass having a light diffusing coating characterized in that said coated glass is made by maintaining a glass substrate at a temperature of at least 90° C. While applying a coating of colloidal silica selected from the group consisting of
   (a) alkali stabilized colloidal silica,
   (b) metal oxide coated acid stabilized colloidal silica,
   (c) alkali stabilized colloidal alumino-silica, and
   (d) alkali stabilized lithium containing colloidal silica, the average particle size of the ultimate silica particles being less than 30 millimicrons in diameter.

2. A coated glass according to claim 1 wherein said ultimate particle size is from 13–14 millimicrons.

3. A coated glass according to claim 1 wherein said coating is an alkali stabilized silica aquasol of ultimate silica particle size of 13–14 millimicrons.

4. A coated glass according to claim 1 wherein said glass is in the shape of a light bulb and said coating is exterior.

5. A coated glass according to claim 1 wherein said glass is in the shape of a light bulb and said coating is interior.

6. A coated glass according to claim 1 wherein said coating is a lithium containing colloidal silica having an $SiO_2:Li_2O$ mole ratio of from 4:1 to 25:1, and an average particle size of from 3 to 30 millimicrons in diameter.

References Cited
UNITED STATES PATENTS

| | | | |
|---|---|---|---|
| 2,668,149 | 2/1954 | Iler | 252—313 |
| 2,832,701 | 4/1958 | Miskel | 117—124 |

ALFRED L. LEAVITT, Primary Examiner

W. E. BALL, Assistant Examiner

U.S. Cl. X.R.

117—94, 124